(12) United States Patent
Konrad

(10) Patent No.: US 11,614,425 B2
(45) Date of Patent: Mar. 28, 2023

(54) DETERMINATION OF THE MIXING RATIO IN PARTICULAR OF A WATER/GLYCOL MIXTURE BY MEANS OF ULTRASOUND AND A HEAT FLOW MEASUREMENT BASED THEREON

(71) Applicant: Siemens Schweiz AG, Zürich (CH)

(72) Inventor: Hilmar Konrad, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 11 days.

(21) Appl. No.: 17/314,611

(22) Filed: May 7, 2021

(65) Prior Publication Data
US 2021/0349484 A1    Nov. 11, 2021

(30) Foreign Application Priority Data

May 11, 2020    (EP) .................................... 20173794

(51) Int. Cl.
*G01N 29/032*    (2006.01)
*G01F 1/667*    (2022.01)
(Continued)

(52) U.S. Cl.
CPC ........ *G01N 29/032* (2013.01); *B01F 23/4111* (2022.01); *B01F 23/452* (2022.01);
(Continued)

(58) Field of Classification Search
CPC .. G05D 11/132; B01F 23/452; B01F 23/4111; Y10T 137/7761; G01N 29/024;
(Continued)

(56) References Cited

U.S. PATENT DOCUMENTS 4,080,837 A * 3/1978 Alexander ........... G01N 29/024
73/645
7,650,903 B2 * 1/2010 Yamamoto ............ F16K 31/126
137/487.5
(Continued)

FOREIGN PATENT DOCUMENTS

DE    10 2007 015 609    10/2008    ............. G01K 17/06
EP    3 467 490    4/2019    ........... G01N 29/024
(Continued)

OTHER PUBLICATIONS

Search Report for EP Application No. 20173794.7, 10 pages, dated Oct. 2, 2020.

*Primary Examiner* — William M McCalister
(74) *Attorney, Agent, or Firm* — Slayden Grubert Beard PLLC

(57) ABSTRACT

Various embodiments include a method for determining the mixing ratio R of a fluid comprising a mixture of at least two different fluids for a technical process in a device comprising: irradiating an ultrasonic signal with a transmission level along a measuring distance running inside a measuring section; measuring a receiving level of the ultrasonic signal at one end of the measuring distance; determining an ultrasonic attenuation of the ultrasonic signal attenuated by the fluid based at least on the transmission and receiving levels of the ultrasonic signal; measuring a temperature of the fluid flowing through the measuring section; and determining a mixing ratio of the at least two different fluids from the determined ultrasonic attenuation and from the measured fluid temperature.

15 Claims, 1 Drawing Sheet

(51) Int. Cl.
*G01N 29/32* (2006.01)
*G01N 29/024* (2006.01)
*G01N 29/44* (2006.01)
*B01F 23/45* (2022.01)
*B01F 23/411* (2022.01)
*G05D 11/13* (2006.01)

(52) U.S. Cl.
CPC ........... *G01F 1/668* (2013.01); *G01N 29/024* (2013.01); *G01N 29/326* (2013.01); *G01N 29/4472* (2013.01); *G01N 2291/0222* (2013.01); *G01N 2291/0224* (2013.01); *G01N 2291/02809* (2013.01); *G01N 2291/106* (2013.01); *G05D 11/132* (2013.01)

(58) Field of Classification Search
CPC ............... G01N 29/032; G01N 29/326; G01N 29/4472; G01N 2291/0222; G01N 2291/0224; G01N 2291/106; G01N 2291/0289; G01F 1/668
USPC ...................................................... 137/487.5
See application file for complete search history.

(56) References Cited

U.S. PATENT DOCUMENTS

| | | | |
|---|---|---|---|
| 10,144,396 B1* | 12/2018 | Krause | B60S 3/04 |
| 2002/0197282 A1* | 12/2002 | Mohseni | A61Q 5/006 |
| | | | 204/157.62 |
| 2003/0033870 A1* | 2/2003 | Shah | G01N 29/449 |
| | | | 73/299 |
| 2004/0115230 A1* | 6/2004 | Divone | B01F 35/831 |
| | | | 424/401 |
| 2009/0166177 A1* | 7/2009 | Wenzel | B01J 19/0066 |
| | | | 366/127 |
| 2015/0013877 A1* | 1/2015 | Earnshaw | B01F 31/81 |
| | | | 156/62.2 |
| 2019/0107513 A1* | 4/2019 | Kolesnikov | G01N 29/348 |
| 2021/0254793 A1* | 8/2021 | Rady | F17D 3/05 |
| 2021/0255162 A1* | 8/2021 | Rady | G05D 11/132 |
| 2021/0275412 A1* | 9/2021 | Ao | A61K 8/064 |
| 2021/0349484 A1* | 11/2021 | Konrad | B01F 23/452 |

FOREIGN PATENT DOCUMENTS

| | | | | |
|---|---|---|---|---|
| JP | 6 586351 | 10/2019 | ............... | B60H 1/22 |
| WO | 2012 065276 | 5/2012 | ............... | G01K 17/10 |

* cited by examiner

DETERMINATION OF THE MIXING RATIO IN PARTICULAR OF A WATER/GLYCOL MIXTURE BY MEANS OF ULTRASOUND AND A HEAT FLOW MEASUREMENT BASED THEREON

CROSS-REFERENCE TO RELATED APPLICATIONS

This application claims priority to EP Application No. 20173794.7 filed May 11, 2020, the contents of which are hereby incorporated by reference in their entirety.

TECHNICAL FIELD

The present disclosure relates to metrology. Various embodiments of the teachings herein include methods for determining the mixing ratio of a fluid, wherein the fluid is a mixture of at least two different fluids, in particular a water/glycol mixture.

BACKGROUND

A water/glycol mixture may be used for a technical process in a device or in a system, in particular in heating technology, ventilation technology, air conditioning and refrigeration technology. The water/glycol mixture is typically used as a heat-conveying or cold-conveying medium. Hereinafter, the mixing ratio of the water/glycol mixture is defined as the quotient of the volume fraction of the glycol and the sum of the volume fractions of the water and glycol. This quotient corresponds to the concentration of the glycol, therefore and lies in the range of 0% to 100%.

International patent application WO 2012/065276 A1 deals with the determination of a heat flow from a heat-conveying liquid. As described therein, two ultrasonic transducers 14, 15 are arranged in a device 10 for measurement of a heat flow. The ultrasonic transducers communicate with a regulator 19. The regulator 19 is in turn connected to an evaluation unit 20. In addition, the device 10 comprises a temperature sensor 17, which is arranged between the two ultrasonic transducers.

In the device 10 from WO 2012/065276 A1, the absolute temperature of a fluid is accordingly determined using the temperature sensor 10. At the same time, the speed of sound in the fluid is measured using the ultrasonic transducers 14, 15. Density and mixing ratio of a water/glycol mixture can accordingly be inferred from the absolute temperature and from the measured speed of sound. The density and the specific heat of the water/glycol mixture can be assigned to the mixing ratio, moreover. Finally, the heating or cooling capacity can then be determined from the volume flow, the temperature difference, the density and from the specific heat capacity.

Patent application DE 102007015609 A1, titled heating or cooling counter device for determining the energy consumption in a temperature controlling loop, describes a measuring device 2 with ultrasonic measuring heads 4 for determining flow rates. The measuring device 2 also comprises two temperature probes 9 for detecting the temperature drop between the inlet flow and the return flow ends. The temperature probes 9 and the ultrasonic measuring heads 4 are connected to a controller 12.

The measuring device 2 includes a microanemometer 13. The microanemometer 13 is arranged between inlet flow side and return flow side and likewise connects to the controller 12. An estimate k in respect of the specific heat results from the values detected by the microanemometer 13. The microanemometer 13 allows values of k to be incorporated in a heat flow estimate, therefore. It is conceivable to infer the composition of a water/glycol mixture from the values of k.

SUMMARY

As taught herein, a manual input is possible. Instead of automatically determining a mixing ratio, the manual, but error-prone, approach requires an input by a user. The approach assumes sufficient knowledge of the mixing ratio of a water/glycol mixture in the pipelines of a heating, ventilation and air conditioning system. The teachings herein provide an alternative and/or more robust measuring method for determination of the mixing ratio of the fluid, in particular a water/glycol mixture. The present disclosure relates to the automatic metrological determination of the mixing ratio of a water/glycol mixture of a liquid flowing through pipelines, arrangements for measuring a heat flow, a heat flow measuring device for the heat flow measurement, in particular a thermal energy counter, and/or adjustable flow valves with a heat flow measuring device of this kind for carrying out the methods described herein.

As an example, some embodiments of the teachings herein include a method for determining the mixing ratio R of a fluid (FL), wherein the fluid (FL) is a mixture of at least two different fluids ($H_2O$, GLY) and is provided for a technical process in a device or system, comprising the following steps: irradiating an ultrasonic signal (US1) with a transmission level along a measuring distance (L), wherein the measuring distance (L) runs inside a measuring section (MESS), measuring a receiving level of the ultrasonic signal (US1) at one end of the measuring distance (L), determining an ultrasonic attenuation ($\alpha$) of the ultrasonic signal attenuated by the fluid (FL), in particular from the transmission and receiving levels of the ultrasonic signal (US1), measuring the fluid temperature (T) of the fluid (FL) flowing through the measuring section (MESS), and determining the mixing ratio R of the at least two different fluids ($H_2O$, GLY) of the mixture (FL) from the determined ultrasonic attenuation ($\alpha$) and from the measured fluid temperature (T).

In some embodiments, the mixture (FL) largely consists of water ($H_2O$) and of an antifreeze, in particular of a glycol (GLY), preferably of (mono-)ethylene glycol and/or propylene glycol.

In some embodiments, a current value of the mixing ratio R is determined by means of a lookup table (TAB) or mathematical function, which in each case map the ultrasonic attenuation ($\alpha$) and the fluid temperature (T) onto the mixing ratio R, in particular onto the mixing ratio R of the water/glycol mixture FL.

In some embodiments, between start and end of the measuring distance (L) a first ultrasonic signal (US1) is irradiated along the measuring distance (L) and a second ultrasonic signal (US2) in the opposite direction along the measuring distance (L), a first and a second ultrasonic attenuation are determined from the respective transmission and receiving levels of the two ultrasonic signals (US1, US2), and the ultrasonic attenuation ($\alpha$) is determined from the mean of the first and second ultrasonic attenuation.

As another example, some embodiments include a method for determining a heat flow (WS) given off by a heat-conveying fluid (FL), wherein the fluid (FL) comprises a mixture of at least two different fluids ($H_2O$, GLY), wherein the fluid (FL) flows from an input position (EIN) through a measuring section (MESS) filled with the fluid (FL) to an outlet position (AUS), wherein the fluid (FL) at the input position (EIN) has an input temperature (T1), in particular an inlet flow temperature, and at the outlet position (AUS) has an outlet temperature (T2) that is lower owing to the heat flow (WS) given off by the fluid (FL), in particular a return flow temperature, wherein the method comprises the following steps: detecting a temperature difference (ΔT) between the input and outlet temperatures (T1, T2), measuring a volume flow (VS) of the fluid (FL) flowing between the inlet and outlet positions (EIN, AUS), determining the mixing ratio R of the at least two different fluids ($H_2O$, GLY) of the mixture (FL) according to the method as claimed in one of the preceding claims, determining a density (ρ) and specific heat ($c_P$) of the heat-conveying fluid (FL) from the measured fluid temperature (T) and from the determined mixing ratio R of the heat-conveying fluid (FL), and determining the heat flow (WS) emanating from the fluid (FL) from the product of the measured volume flow (VS), from the measured temperature difference (ΔT), from the determined density (ρ) and from the determined specific heat ($c_P$).

In some embodiments, the volume flow (VS) is determined by means of an ultrasonic flow measuring method and wherein the determination of the volume flow (VS) and the determination of the ultrasonic attenuation (α) takes place in measuring phases at separate times.

In some embodiments, a current value for the density (ρ) and for the specific heat ($c_P$) of the heat-conveying fluid (FL), in particular of the water/glycol mixture, is determined by means of a lookup table (TAB) or a mathematical function, which in each case map the calculated mixing ratio R and the measured fluid temperature (T) onto the density (ρ) and specific heat ($c_P$) to be determined of the heat-conveying fluid (FL).

In some embodiments, the flow speed ($v_M$) of the fluid (FL) flowing through a specified flow cross-section (A) of the measuring section (MESS) is measured by means of an ultrasonic runtime differential method, wherein a compensation factor (K) for the measured mean flow speed ($v_M$) is determined from the measured fluid temperature (T) and from the determined mixing ratio R of the heat-conveying fluid (FL), and wherein the volume flow (VS) is calculated from the product of the flow cross-section (A), from the measured flow speed ($v_M$) and from the compensation factor (K).

In some embodiments, a current compensation value K is determined for the measured mean flow speed ($v_M$) by means of a lookup table (TAB) or mathematical function, which in each case map the measured mean flow speed ($v_M$), the fluid temperature (T) and the mixing ratio R onto a quotient of the actual mean flow speed (v) to the measured mean flow speed ($v_M$).

As another example, some embodiments include an arrangement (1) for measuring a heat flow (WS) for carrying out the method as claimed in one of the preceding claims 5 to 9, the arrangement having first means (51, 52) for detecting a temperature difference (ΔT) between an input temperature (T1) and an outlet temperature (T1, T2), in particular between an inlet flow temperature and a return flow temperature, second means (31, 32) for measuring a volume flow (VS) of the fluid (FL) flowing through the measuring section (MESS), third means (31, 32) for determining the ultrasonic attenuation (α) through the fluid (FL) in the measuring section (MESS), fourth means (50) for detecting the fluid temperature (T) of the fluid (FL) flowing through the measuring section (MESS), and a control unit (MC), which is connected to the first, second, third and fourth means (31, 32, 51, 52, 50) and which is adapted to determine the heat flow (WS) from the temperature difference (ΔT), from the volume flow (VS), from the ultrasonic attenuation (α) and from the fluid temperature (T) and to optionally output it.

In some embodiments, the first means (51, 52) comprise a first temperature sensor (51) and a second temperature sensor (52), and wherein the first temperature sensor (51) is arranged at the input position (EIN) for detection of the input temperature (T1) and the second temperature sensor (52) is arranged at the outlet position (AUS) for detection of the outlet temperature (T2).

In some embodiments, the fourth means (50) are formed by the first temperature sensor (51) and/or by the second temperature sensor (52) of the first means (51, 52), and wherein the control unit (MC) is adapted to derive the fluid temperature (T) from the detected input temperature (T1) and/or from the detected outlet temperature (T2).

As another example, some embodiments include a heat flow measuring device (10) for heat flow measurement, in particular thermal energy counter, for carrying out the method as described herein, having a housing (G), a line section (2'), in particular a measuring pipe, received in the housing (G), an inlet and outlet (EL, AL) arranged on the housing (G) for the line section (2'), wherein the fluid (FL) is provided for flowing through the measuring section (MESS) inside the line section (2), a first temperature measurement input (11) for connecting a first external temperature sensor (61) for measuring a first external temperature (T1), in particular an inlet flow temperature, and/or a second temperature measurement input (12) for connecting a second external temperature sensor (52) for measuring a second external temperature (T2), in particular a return flow temperature, and/or a fluid temperature sensor (50) arranged in the housing (G) in the region between the inlet (EL) and the outlet (AL) for measuring a fluid temperature (T), second means (31, 32) for measuring the volume flow (VS) of the fluid (FL) flowing through the measuring section (MESS), third means (51, 52) for determining the ultrasonic attenuation (α) by the fluid (FL) in the measuring section (MESS), and a control unit (MC), which is connected to the first and/or second temperature measurement input (11, 12) and/or to the fluid temperature sensor (50) and to the second and third means (31, 32, 51, 52) and which is adapted to determine a heat flow (WS) from a temperature difference (ΔT) optionally between the first and second external temperature (T1, T2), or between the fluid temperature (T) and the second external temperature (T2), or between the first external temperature (T1) and the fluid temperature (T), and from the volume flow (VS), from the ultrasonic attenuation (α) and from the fluid temperature (T) and to output a current value of the heat flow (WS) and/or a variable derived therefrom, in particular a counter value of a cumulative thermal energy, at the heat flow measuring device (10) and/or at a data interface (BUS) of the heat flow measuring device (10).

In some embodiments, the second and third means (31, 32) have at least one ultrasonic measuring arrangement (30) with a first and second ultrasonic transducer (31, 32), wherein the first ultrasonic transducer (31) is arranged and oriented at a start of the measuring distance (L) and along it (L) for irradiating a first ultrasonic signal (US1), wherein the second ultrasonic transducer (32) is arranged and oriented at an end of the measuring distance (L) for receiving the first ultrasonic signal (US1), and/or wherein the second ultrasonic transducer (31) is arranged and oriented in the opposite direction at the end of the measuring distance (L) and along it (L) for irradiating a second ultrasonic signal (US2), wherein the first ultrasonic transducer (31) is arranged and oriented at the start of the measuring distance (L) for receiving the second ultrasonic signal (US2), wherein the measuring distance (L) inside the measuring section (MESS) runs at an acute angle (β) to the flow direction of the fluid (FL) or counter thereto, wherein the control unit (MC) is connected in terms of signaling and/or data to the first ultrasonic transducer (31) and to the second ultrasonic transducer (32), and wherein the control unit (MC) is adapted to actuate the first and second ultrasonic transducers (31, 32) alternately for irradiating and receiving a respective ultrasonic signal (US1, US2) for determination of the mean flow speed ($v_M$) and for determination of the ultrasonic attenuation (α) in measuring phases at separate times in each case.

In some embodiments, the control unit (MC) has a non-volatile memory, to which the control unit (MC) has access in terms of data, and wherein a lookup table (TAB) or a mathematical function for determination of a current value of the mixing ratio R is stored in the non-volatile memory, which in each case map the ultrasonic attenuation (α) and the fluid temperature (T) onto the mixing ratio R in particular of the water/glycol mixture (FL), and/or wherein a lookup table (TAB) or a mathematical function for determination of a current value for the density (ρ) and for the specific heat ($c_P$) is stored in the non-volatile memory, which in each case map the calculated mixing ratio R and the measured fluid temperature (T) onto the density (ρ) and specific heat ($c_P$) to be determined in particular of the water/glycol mixture (FL), and/or wherein a lookup table or a mathematical function for determination of a current compensation value K for the measured mean flow speed ($v_M$) is stored in the non-volatile memory, which in each case map the measured mean flow speed ($v_M$), the fluid temperature (T) and the mixing ratio R onto a quotient of the actual mean flow speed (v) to the measured mean flow speed ($v_M$).

As another example, some embodiments include an adjustable flow valve (20), in particular Smart Valve, with a heat flow measuring device (10) as claimed in one of the preceding claims 13 to 15, with a valve unit (13), e.g. received in the housing (G), which can be actuated by means of the control unit (MC) for setting an equal volume flow (VS) flowing through the valve unit (13) and through the measuring section (MESS).

BRIEF DESCRIPTION OF THE DRAWINGS

The teachings of the present disclosure and various embodiments of the teachings herein are explained using the example of the following Figures. In the drawings.

DETAILED DESCRIPTION

Figure 1:
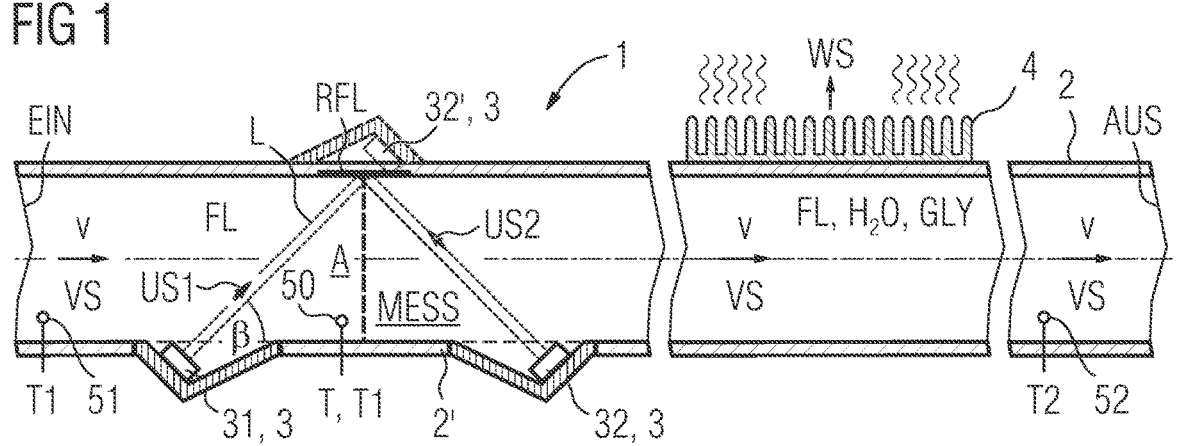
FIG. 1 shows an example arrangement for measuring a heat flow with the aid of the methods described herein for determining the mixing ratio of a water/glycol mixture.

The teachings of the present disclosure include the automatic determination of the mixing ratio in intelligent (smart) adjustable flow valves. Knowledge of the glycol content in a mixture of water and glycol allows adequate processing of the heat or cold transfer through the valve. To avoid unnecessary repetitions, for the further description, features and details, which are described in connection with the method for determining the mixing ratio of a mixture and in connection with the inventive method for determining a heat flow given off by a heat-conveying fluid, it is understood that these also apply in connection with and in view of the arrangement, adapted to carry out the method, for measuring a heat flow and the heat flow measuring device adapted to carry out the method, and adjustable gate valve (Smart Valve) and vice versa.

Various embodiments of the teachings herein include a method for determining the mixing ratio of a mixture of at least two different fluids comprising:
  irradiating an ultrasonic signal with a transmission level along a measuring distance, wherein the measuring distance runs inside a measuring section,
  measuring a receiving level of the ultrasonic signal at one end of the measuring distance,
  determining an ultrasonic attenuation of the ultrasonic signal attenuated by the fluid, in particular from the transmission and receiving levels of the ultrasonic signal,
  measuring the fluid temperature of the fluid flowing through the measuring section, and
  determining the mixing ratio R of the at least two different fluids of the mixture from the determined ultrasonic attenuation and from the measured fluid temperature.

In some embodiments, the effect of ultrasonic waves on the hydroxyl groups, in other words on the OH-groups of a molecule dissolved in the water, is lossy due to relaxation processes. This applies, in particular, to glycol antifreeze (for example Antifrogen® N, Glysantin®), which for the most part contain (mono-)ethylene glycol, in particular ethane-1,2-diol [$CH_2(OH)$—$CH_2(OH)$], and small volume fractions of corrosion inhibitors. In some embodiments, glycol antifreeze can contain propylene glycol, in particular 1,2-propanediol [$CH_3$—$CH(OH)$—$CH_2(OH)$], and small volume fractions of corrosion inhibitors.

The ultrasonic attenuation decreases on the one hand with increasing fluid temperature and increases on the other hand with the mixing ratio, in particular of the water/glycol antifreeze. In the simplest case, the attenuation values are metrologically calculated for the ultrasonic attenuation in that, for example, the attenuation values are measured for increasing concentration values of the glycol antifreeze beginning from =0% to 100% and in each case for temperature values in the range of −20° C. to 80° C. For pure water this is only possible at temperature values greater than 0° C. due to the freezing point of water. It can also be sufficient to measure attenuation values for the ultrasonic attenuation on the basis of rougher concentration and temperature values, such as in an increment of 10% for the concentration of the glycol antifreeze and in an increment of 10° C. for the fluid temperature.

Provided as a mixture are, for example, just water, for example tap water or demineralized water, or a mixture of water and at least one further substance which may comprise:
  calcium chloride,
  ethanol,
  glycerin,
  potassium acetate,
  potassium formate,
  magnesium chloride, methanol, and/or sodium chloride.

The preceding lists are not exhaustive.

In some embodiments, a fixed frequency ultrasonic signal is irradiated, for example for a period in the range from 250 µs to 30 s, e.g. from 250 µs to 1 s, into the measuring section. The fixed-frequency ultrasonic signal is, for example, a sinusoidal, rectangular, trapezoidal, or triangular ultrasonic signal. The signal is irradiated continuously into the measuring section. In particular, the ultrasonic signal is irradiated with constant transmission amplitude into the measuring section. The ultrasonic signal is irradiated, in particular, in a frequency range of 40 kHz to 50 MHz, e.g. in a frequency range of 1 MHz to 10 MHz, into the measuring section. The received ultrasonic signal is filtered according to the transmission frequency and/or the transmission period and/or the transmission amplitude and/or the signal shape of the transmitted ultrasonic signal, in other words by means of a corresponding, equal receive frequency. In some embodiments, the signal is averaged over the transmission period.

Irradiating an ultrasonic signal along a measuring distance inside a measuring section is taken to mean that the main direction of propagation of the emitted ultrasonic signal runs along this measuring distance. The measuring section is typically a pipe or a pipe section or a hose or a hose section. It can be made of metal, plastics material, rubber, or ceramic. It has, in some embodiments, a circular cross-section.

Compared to mathematical calculation of the mixing ratio on the basis of the measurement of the speed of sound of the fluid, the mathematical calculation of the mixing ratio on the basis of the measurement of the ultrasonic attenuation is much more robust. A determination of the speed of sound based on an ultrasonic runtime measurement is thus more susceptible to inhomogeneities, such as larger particles of dirt or air bubbles, in respect of the evaluation of the measurement due to interference signals owing to scattering of ultrasonic signals.

In some embodiments, the mixing ratio can be determined on the basis of frequency-dependent comparison attenuation values, for example from a reference series of measurements that has previously taken place for water/glycol mixtures with different mixing ratios, at different fluid temperatures and at different transmission frequencies in each case for the ultrasonic signal irradiated into the measuring section. Two, three, or more transmission frequencies that are different from each other and correspondingly equal filter frequencies at the receive side can be used.

In some embodiments, the mixing ratio of the at least two different fluids of the mixture is determined if the (mean) flow speed of the volume flow flowing through the measuring section falls below a specified lower limit value. The lower limit value can be of such a size that there is a predominantly laminar flow in the measuring section. In some embodiments, the lower limit value is less than 2 m/s, e.g. less than 0.5 m/s. The flow speed can be measured, for example, by means of a known ultrasonic runtime differential method or by means of a microanemometer.

In some embodiments, a current value of the mixing ratio is determined by means of a (first) lookup table or (first) mathematical function, which in each case map the ultrasonic attenuation and the fluid temperature onto the mixing ratio R, in particular onto the mixing ratio R of the water/glycol mixture.

Examples of (first) mathematical functions are analytical functions or polynomial developments, which at least approximately describe the above-mentioned functional connection. The ultrasonic attenuation describes the ratio of the signal strength of the received ultrasonic signal to the signal strength of the transmitted ultrasonic signal. Even if the ultrasonic attenuation is determined from a transmission level and from a measured receiving level of the ultrasonic signal, a ratio between received and transmitted signal strength of the ultrasonic signal forms the basis—independently of a logarithmic calculation. In some embodiments, the ultrasonic attenuation is calculated using a dB value. A measurement of the transmission level of the transmitted ultrasonic signal at the location of irradiation into the measuring section is not required. The signal strength of the ultrasonic signal can be measured, for example, in the course of a type test and then serve as a reference for further measuring arrangements as described herein.

In some embodiments, a first ultrasonic signal is irradiated along the measuring distance and a second ultrasonic signal in the opposite direction along the measuring distance between start and end of the measuring distance. A first and a second ultrasonic attenuation is determined from the respective transmission and receiving levels of the two ultrasonic signals. The ultrasonic attenuation is determined from the (arithmetic) mean of the first and second ultrasonic attenuation. The measuring accuracy is increased as a result. A plurality of values for the ultrasonic attenuations in the forward direction and in the opposite direction can also be arithmetically added and be divided by the number of measurements made. The measuring accuracy is increased further as a result.

In some embodiments, there is a method for determining a heat flow given off by a heat-conveying fluid comprising a mixture of at least two different fluids. In some embodiments, the fluid is a mixture of water and a glycol antifreeze, as described in the introduction. The fluid flows from an input position through a measuring section filled with the fluid to an outlet position. At the input position the fluid has an input temperature, in particular an inlet flow temperature, and at the outlet position an outlet temperature that is lower owing to the heat flow given off by the fluid, in particular a return flow temperature.

In some embodiments, the method comprises:

detecting a temperature difference $\Delta T$ between the input and outlet temperatures, measuring a volume flow $dV/dt$ of the fluid flowing between the input and outlet positions, determining the mixing ratio R of the at least two different fluids of the mixture, preferably of the water/glycol mixture, according to the method described in the introduction for determination of the mixing ratio R by means of a measurement of the ultrasonic attenuation of the fluid flowing through the measuring section, determining a density $\rho$ and specific heat $c_P$ of the heat-conveying fluid from the measured fluid temperature and from the determined mixing ratio R of the heat-conveying fluid, and determining the heat flow $dQ/dt$ given off by the fluid from the product of the measured volume flow $dV/dt$, from the measured temperature difference $\Delta T$ and from the determined density $\rho$ and from the determined specific heat or specific heat capacity $c_P$.

The formula for the calculated heat flow is, therefore:

$$dQ/dt = dV/dt \cdot \Delta T \cdot \rho(T,R) \cdot c_P(T,R);$$

The brackets (T, R) indicate that the calculated density and specific heat are physical variables dependent on the fluid temperature T and the mixing ratio R of the preferably water/glycol mixture. The physical unit of the calculated heat flow is typically the watt (W) or kilowatt (kW). A current value for the density ρ and specific heat $c_P$ of the heat-conveying fluid, in particular of the water/glycol mixture, can be determined by means of a (second) lookup table or a (second) mathematical function, therefore, which in each case map the calculated mixing ratio R and the measured fluid temperature onto the density ρ and specific heat $c_P$ of the heat-conveying fluid to be determined.

In some embodiments, a metrologically very accurate determination of the heat flow given off by the heat-conveying fluid between the input position and the outlet position is provided. In some embodiments, the calculated heat flow can also have negative values. In this case, the «negative» heat flow corresponds to a cooling flow. This is the case if the temperature difference between the input position and the outlet position is negative. In other words, this is a cooling flow given off by a cold-conveying fluid. This is the case, for example, with a cooling device in a building.

In some embodiments, the volume flow is determined by means of an ultrasonic flow measuring method. The determination of the volume flow and the determination of the ultrasonic attenuation take place in measuring phases separated in time. In some embodiments, both the volume flow and the ultrasonic attenuation can be metrologically calculated by means of just one physical measuring principle as a result.

In some embodiments, the (mean) flow speed $v_M$ of the fluid flowing through a specified flow cross-section A of the measuring section is measured by means of an ultrasonic runtime differential method. A compensation factor K for the measured mean flow speed $v_M$ is determined from the measured fluid temperature T and from the determined mixing ratio R of the heat-conveying fluid. Finally, the volume flow dV/dt is then determined from the product of the flow cross-section A, from the measured flow speed $v_M$ and from the compensation factor K.

The formula for the calculated volume flow is, therefore:

$$dV/dt = A \cdot K(v_M, T, R) \cdot v_M;$$

The brackets ($v_M$, T, R) indicate that the compensation factor is a dimensionless factor dependent on the measured mean flow speed $v_M$, on the fluid temperature T and on the calculated mixing ratio R. In some embodiments, a further compensation factor can also be calculated for the flow cross-section A. The respective compensation factors can also be represented as a quotient. The respective compensation factors can also be a compensation speed value for compensation of the measured mean flow speed or a compensation area value for compensation of the specified flow cross-section. A corrected volume flow can be calculated, which comes as close as possible to the actual volume flow.

The reason for the required compensation is the dynamic viscosity dependent on the fluid temperature and the mixing ratio. With a predominantly laminar flow in the measuring section (pipe) at relatively low flow speeds (typically <3 m/s) this leads to a flow profile forming in which the flow speed is highest in the center of the pipe and which decreases greatly in the direction of the pipe wall. By contrast, the differences with a predominantly turbulent flow in the case of higher flow speeds (typically >3 m/s) is considerably lower.

In some embodiments, a current compensation value is determined for the measured mean flow speed by means of a (third) lookup table or (third) mathematical function, which in each case map the fluid temperature and the mixing ratio R onto a quotient of the actual mean flow speed to the measured mean flow speed. In the simplest case, the compensation values for the volume flow are metrologically calculated in that, for example, current attenuation values are measured for increasing concentration values of the glycol antifreeze, beginning from 0% to 100%, in each case for temperature values in the range of −20° C. to 80° C., and in each case for increasing mean flow speeds in the measuring section. For pure water this is only possible at temperature values greater than 0° C. owing to the freezing point of water. It can also be sufficient to measure the compensation values on the basis of rougher concentration, temperature, and flow speed values, such as in an increment of 10% for the concentration of the glycol antifreeze, in an increment of 10° C. for the fluid temperature, in an increment of 0.1 m/s for lower mean flow speeds ($v_M$<3 m/s) and in an increment of 1 m/s for greater mean flow speeds ($v_M$>3 m/s). In some embodiments, an arrangement has:

- first means for detecting a temperature difference between an input temperature and an outlet temperature in particular between an inlet flow and return flow temperature,
- second means for measuring a volume flow of the fluid flowing through the measuring section,
- third means for determining the ultrasonic attenuation by the fluid in the measuring section,
- fourth means for detecting the fluid temperature of the fluid flowing through the measuring section, and
- a control unit, which is connected to the first, second, third and fourth means.

The control unit is adapted to determine the heat flow from the temperature difference, from the volume flow, from the ultrasonic attenuation and from the fluid temperature and optionally output it. A current watt value of the heat flow can then be output, for example on a display of the arrangement or via a cabled or wireless interface to an external, remote display unit.

In some embodiments, a control unit comprises a processor-supported control unit, e.g. a microcontroller. The microcontroller MC comprises a memory. In some embodiments, the above-described lookup tables or mathematical functions for determination of the mixing ratio of a mixture and/or the above-described compensation values for the determination of the volume flow of a mixture can be stored in this memory. The memory of the microcontroller MC may be non-volatile, such as a flash memory. A computer program with program routines is stored or can be loaded in the memory of the microcontroller, which routines are formed by a processor unit of the microcontroller to carry out the method steps of the methods described herein. The microcontroller can have specific function blocks, moreover, which are already integrated in the microcontroller as hardware function units, such as analog-to-digital converters, signal processors, digital input/output units and data interfaces.

In some embodiments, the first means comprise a first temperature sensor and a second temperature sensor. The first temperature sensor is arranged at the input position for detection of the input temperature. The second temperature sensor is arranged at the outlet position for detection of the outlet temperature. The temperature sensor can be, for example, what is known as PT 100 or PT 1000.

In some embodiments, the fourth means are formed by the first temperature sensor and/or by the second temperature sensor of the first means. The control unit is adapted to derive the fluid temperature from the detected input temperature and/or from the detected outlet temperature. In other words, the first or second temperature sensor, which is spatially ordered in the vicinity of the measuring section, can be regarded as equivalent to the fluid temperature sensor. A separate fluid temperature sensor is not required, therefore.

In some embodiments, there is a heat flow measuring device for the heat flow measurement for carrying out the methods described herein. In some embodiments, the heat flow measuring device comprises a thermal energy counter. A heat flow measuring device of this kind may have:
- a housing,
- a line section, in particular a measuring pipe, received in the housing,
- an inlet and outlet arranged on the housing for the line section, wherein the fluid is provided for flowing through the measuring section inside the line section,
- a first temperature measurement input for connecting a first external temperature sensor for measuring a first external temperature, in particular an inlet flow temperature, and/or
- a second temperature measurement input for connecting a second external temperature sensor for measuring a second external temperature, in particular a return flow temperature, and/or
- a fluid temperature sensor arranged in the housing in the region between the inlet and the outlet for measuring a fluid temperature,
- second means for measuring the volume flow of the fluid flowing through the measuring section,
- third means for determining the ultrasonic attenuation by the fluid in the measuring section.

In some embodiments, the heat flow measuring device includes a control unit, which is connected to the first and/or second temperature measurement input and/or to the fluid temperature sensor and to the second and third means. It is adapted or programmed to determine a heat flow from a detected temperature difference, from the volume flow, from the ultrasonic attenuation and from the fluid temperature and to output a current value of the heat flow and/or a variable derived therefrom, in particular a counter value of a cumulative thermal energy, at the heat flow measuring device and/or at a data interface of the heat flow measuring device.

The control unit can also be adapted to determine the temperature difference optionally either between the measured first external temperature and the measured second external temperature, or between the measured fluid temperature and the measured second temperature, or between first external temperature and the measured fluid temperature. The selection can be made, for example, by a user input on initial operation of the heat flow measuring device or automatically by way of the control unit with the existence of plausible temperature values.

In some embodiments, the second and third means have at least one ultrasonic measuring device with a first and second ultrasonic transducer. The first ultrasonic transducer is arranged and oriented at a start of the measuring distance along the measuring distance for irradiating a first ultrasonic signal. The second ultrasonic transducer is arranged and oriented at an end of the measuring distance for receiving the first ultrasonic signal. The second ultrasonic transducer is arranged and oriented in the opposite direction at the end of the measuring distance and along the measuring distance for irradiating a second ultrasonic signal. The first ultrasonic transducer is arranged and oriented at the start of the measuring distance for receiving the second ultrasonic signal. The measuring distance runs inside of the measuring section at an acute angle to the flow direction of the fluid or counter to it. The control unit is connected in terms of signaling and/or data to the first ultrasonic transducer and to the second ultrasonic transducer. The control unit may be adapted or programmed to actuate the first and second ultrasonic transducers alternately for irradiating and receiving a respective ultrasonic signal for determination of the flow speed and for determination of the ultrasonic attenuation in measuring phases at separate times in each case.

In some embodiments, the flow speed and, on the basis thereof, the volume flow, as well as the ultrasonic attenuation and, on the basis thereof, the mixing ratio, in particular of a water/glycol mixture, can be determined with one and the same ultrasonic measuring device. In some embodiments, the acute angle lies in an angular range of 45°±30°, e.g. at 45°. In addition to the arrangement of the two ultrasonic transducers or ultrasonic receivers, the ultrasonic measuring device can typically also comprise electronic driver and filter modules.

In some embodiments, the control unit has a non-volatile memory to which the control unit has access in terms of data. A (first) lookup table or a (first) mathematical function for determination of a current value of the mixing ratio R is stored in the non-volatile memory, which in each case map the ultrasonic attenuation and the fluid temperature onto the mixing ratio R, in particular of the water/glycol mixture FL. In some embodiments, a (second) lookup table or a (second) mathematical function for determination of a current value for the density and for the specific heat is stored in the non-volatile memory, which in each case map the determined mixing ratio R and the measured fluid temperature onto the density and specific heat to be determined, in particular of the water/glycol mixture.

In some embodiments, a (third) lookup table or a (third) mathematical function for determination of a current compensation value K for the measured mean flow speed is stored in the non-volatile memory, which in each case map the measured mean flow speed, the fluid temperature and the mixing ratio R onto a quotient of the actual mean flow speed to the measured mean flow speed. The above-described first and/or second and/or third lookup table as well as the first and/or second and/or third mathematical function can also form a joint lookup table or a joint mathematical function.

In some embodiments, the control unit is a microcontroller, in whose memory the above-described lookup tables or mathematical functions are stored. A computer program with program routines is stored or can be loaded in the memory of the microcontroller, which routines are formed by a processor unit of the microcontroller to carry out the method steps of the inventive method.

In some embodiments, there is an adjustable flow valve, e.g. a Smart Valve. An adjustable flow valve of this kind comprises an above-described heat flow measuring device. In addition, the adjustable flow valve comprises a valve unit, e.g. received in the housing, which can be actuated by means of the control unit for setting an equal volume flow flowing through the valve unit and through the measuring section. The adjustable flow valve is typically adapted to regulate the heat flow to a desired value received, for example, via a bus interface of the adjustable flow valve. Adjusting movements at the valve unit can be required here if, for example, the pressure in the pipelines and the pressure in the measuring section as well, therefore changes.

FIG. 1 shows an exemplary arrangement 1 for measuring a heat flow VS with the aid of the methods described herein for determining the mixing ratio of a water/glycol mixture FL, $H_2O$, GLY. Reference character 2 designates a pipe or line section, for example of a heating system. Reference character 2' designates a line section that serves as a measuring pipe in which a measuring section MESS is located. An ultrasonic measuring arrangement 3 with a first and a second ultrasonic transducer 31, 32 is arranged in the measuring section MESS. The measuring section MESS extends at least beyond the two ultrasonic transducers 31, 32, therefore.

Here the flow direction, identified by arrows, of the volume flow VS flowing in the line section 2 runs parallel to the center (of the pipe), shown in dot-dash lines. Reference character v designates a mean flow speed of the volume flow VS and A designates the flow cross-section of the line section 2. In a typical case of a pipe as the line section 2, the flow cross-section is a circular cross-section. The volume flow VS results mathematically from the product of the mean flow speed v and the flow cross-section A. An input position EIN for the heat-conveying fluid F can be seen in the left part of FIG. 1 and an outlet position AUS can be seen in the right part of FIG. 1. According to the marked flow direction, the heat-conveying fluid F flows through the measuring section M and further without inflow and outflow through a heat exchanger 4 while giving off a heat flow WS and then further to an outlet position AUS of the arrangement 1.

In some embodiments, a first temperature sensor 51 for detection of an input temperature T1 of the heat-conveying fluid FL is arranged at the input position EIN. A second temperature sensor 52 for detection of an outlet temperature T2 of the heat-conveying fluid FL is arranged at the outlet position AUS. Finally, a fluid temperature sensor 50 is arranged at a position inside the measuring section MESS for detection of a fluid temperature T of the heat-conveying fluid FL. The temperature sensors 50, 51, 52 and the two ultrasonic transducers 31, 32 are connected in terms of signaling or data to a control unit (not shown).

The two illustrated ultrasonic transducers 31, 32, in some cases, ultrasonic transceivers, are arranged and oriented at an acute angle β of, for example, 45° to the flow direction and counter to it. The two ultrasonic transducers 31, 32 can be attached subsequently as what are known as clamp-on ultrasonic transducers to the line section 2 or pipeline section. In some embodiments, they can be inserted subsequently in holes in a line section 2 or in a pipeline section.

The arrangement 1 shown in FIG. 1 is particularly suitable for this subsequent attachment of the ultrasonic transducers 31, 32, therefore. In some embodiments, the two ultrasonic transducers 31, 32 can already be integral elements of a measuring pipe 2', such as a heat flow measuring device 10 according to FIG. 2. Furthermore, the ultrasonic transducers 31, 32 being considered can be arranged or inserted for all alternatives on the same side of the measuring section MESS.

In some embodiments, an opposing side of the measuring section MESS, in particular an inner wall of a pipe 2, serves as a reflector RLF. The two ultrasonic transducers 31, 32 are arranged and oriented relative to each other such that an ultrasonic signal US1, US2 emitted by one of the two ultrasonic transducers 31, 32 along the acoustic path marked in broken lines in each case and further after reflection at the reflector RFL frontally strikes the in each case acoustically opposing ultrasonic transducer 32, 31. In some embodiments, the acoustic paths of the two ultrasonic transducers 31, 32 align with each other. The length of the acoustic path corresponds to the measuring distance L for the respective ultrasonic signal US1, US2 between the two ultrasonic transducers 31, 32. Reference character 32' designates a further second ultrasonic transducer as part of an alternative ultrasonic measuring arrangement 3.

In this case, the two ultrasonic transducers 31, 32' are located directly straight opposite each other. A respective emitted ultrasonic signal US1, US2 the reaches the respective opposing ultrasonic transducer 32, 31 on the acoustically shortest route and without further reflection at an inner side of the measuring section MESS or at an inner wall of the pipe.

The control unit shown in FIG. 1 may be adapted or programmed to mathematically determine the heat flow WS from the calculated temperature difference ΔT between the detected input temperature T1 and the detected outlet temperature T2, from the metrologically detected volume flow VS, from the ultrasonic attenuation detected by means of the ultrasonic measuring arrangement 3 and from the fluid temperature T. A numerical value, such as a watt value, can then be determined for the current heat flow WS, and/or by temporal integration an associated cumulative numerical value for the conveyed thermal energy, such as a kWh value, and optionally be output on a display of the arrangement 1 connected to the control unit.

In some embodiments, the control unit is adapted to determine the volume flow VS by means of an ultrasonic flow measuring method, in particular by means of an ultrasonic runtime measurement. It is also adapted to carry out the determination of the volume flow VS and the determination of the ultrasonic attenuation α in z measuring phases at separate times. For this, the control unit is adapted to actuate the two ultrasonic transducers 31, 32 alternately for emitting a first ultrasonic signal US1 and for receiving an ultrasonic signal attenuated by the heat-conveying fluid FL. The mixing ratio R of the heat-conveying fluid FL, in particular of the water/glycol mixture, and the mean flow speed for the calculation of the volume flow VS can then be determined from the measured ultrasonic attenuation values and ultrasonic runtimes by means of the control unit.

Figure 2:
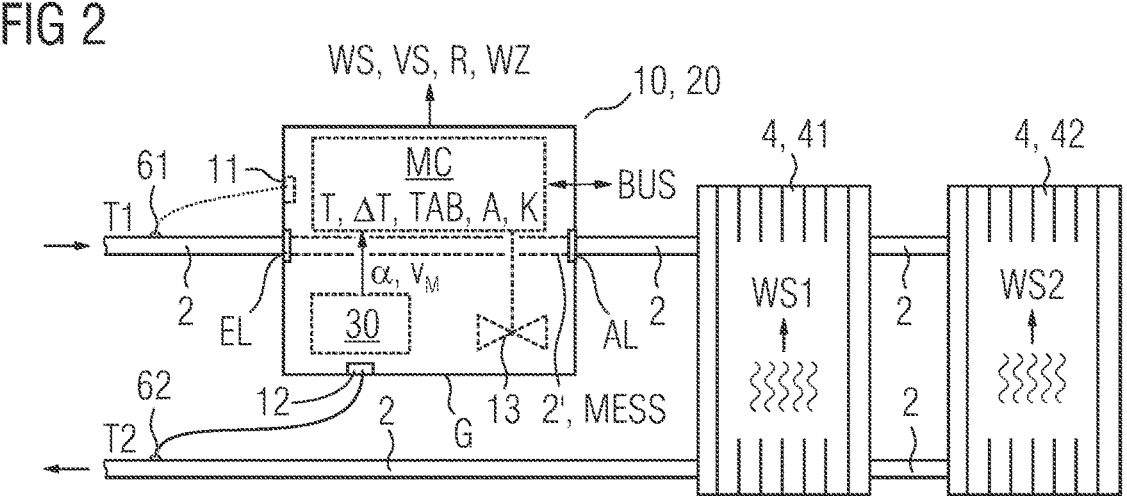
FIG. 2 an example of a heat flow measuring device as an assembly with the aid of the methods described herein for determining the mixing ratio of a water/glycol mixture.

FIG. 2 shows an example of a heat flow measuring device 10 as an assembly with the aid of the methods described herein for determining the mixing ratio R of a water/glycol mixture. Compared to the spatially distributed arrangement 1 shown in FIG. 1, in the example of FIG. 2 all fundamental components EL, AL, 2', 30, MC, 11, 12 for a heat flow measurement are compactly accommodated in a housing G of the heat flow measuring device 10. The illustrated heat flow measuring device 10 has an inlet opening EL arranged on the housing G and an outlet opening AL arranged there for possible connection of pipes 2 or hoses, for example of a heating system. Arranged between the inlet and outlet openings EL, AL without further inflow and outflow is a measuring pipe 2' in which the measuring section MESS is arranged or formed.

In the example of FIG. 2, a heat-conveying fluid FL flows as what is known as an inlet flow, for example coming from a heating system, from the left through the upper line section 2 through the heat flow measuring device 10 and onwards to two heat exchangers 41, 42. Reference characters WS1, WS2 designate the partial heat flows given off by the two heat exchangers 41, 42, which, in total, produce the overall heat flow WS to be measured. What is known as the return flow can be seen in the lower part of FIG. 2. The cooled heat-conveying fluid FL flows from right to left back to the exemplary heating system again. The heating circuit is closed.

The illustrated heat flow measuring device 10 has a first temperature measurement input 11 for connecting a first external temperature sensor 61 for measuring a first external temperature T1, here the inlet flow temperature. It also has a second temperature measurement input 12 for connecting a second external temperature sensor 52 for measuring a second external temperature T2, here the return flow temperature. The two external temperature sensors 61, 62, such as PT 100, are applied preferably directly to the outer side of the pipes 2 or line section. One or both temperature sensors 61, 62 can already be permanently connected by their respective feed line to the respective temperature measurement input 11, 12 or be compactly guided with their feed line already through the housing G of the heat flow measuring device 10. Optionally a fluid temperature sensor 50 for measuring a fluid temperature T is arranged in the housing G in the region between the inlet EL and the outlet AL.

An ultrasonic measuring device 30 is also already arranged in the housing G, and this is adapted for measuring the volume flow VS of the fluid FL flowing through the measuring section MESS and for determining the ultrasonic attenuation α through the fluid FL in the measuring section MESS. In its function the ultrasonic measuring device 30 corresponds to that of the ultrasonic measuring arrangement 3 described in FIG. 1 for determination of the volume flow VS and the ultrasonic attenuation α in measuring phases at separate times. At the output side the ultrasonic measuring device 30 provides a control unit MC, designed as a microcontroller, of the heat flow measuring device 10 with the measured ultrasonic attenuation α and the measured mean flow speed $v_M$ of for metrological evaluation.

The control unit MC may be programmed to determine the heat flow WS from the temperature difference ΔT, e.g. between the measured first and second external temperature T1, T2 (inlet flow temperature, return flow temperature), from the volume flow VS as a product of the flow cross-section A stored in the control unit MC and the mean flow speed $v_M$, from the ultrasonic attenuation α and from the fluid temperature T and to output a current value of the heat flow WS and/or a variable derived therefrom, in particular a counter value WZ of a cumulative thermal energy, and/or a current value for the volume flow VS at the heat flow measuring device 10, for example on a display.

In some embodiments, a mixing ratio R of the heat-conveying fluid FL, in particular of the water/glycol mixture $H_2O$, GLY, can be mathematically calculated by the control unit MC on the basis of the measured ultrasonic attenuation α and from the fluid temperature T and can be output, for example on the display in the form of a percentage. The above-mentioned values for the heat flow WS, for the volume flow VS, for the mixing ratio R and for the counter value WZ of a cumulative thermal energy can also be output via an interface BUS of the illustrated heat flow measuring device 10.

A lookup table TAB or mathematical function stored in the control unit MC or in the microcontroller, which in each case map the ultrasonic attenuation α and the fluid temperature T onto the mixing ratio R, in particular of the water/glycol mixture FL, are used for mathematical calculation of the mixing ratio R. In addition, the lookup table TAB or mathematical function stored in the control unit MC, which in each case map the calculated mixing ratio R and the measured fluid temperature T onto the density ρ and specific heat $c_P$ of the heat-conveying fluid FL to be determined, in particular of the water/glycol mixture, is used for mathematical calculation of a current value for the density ρ and for the specific heat $c_P$ of the heat-conveying fluid FL, in particular of the water/glycol mixture $H_2O$, GLY.

In some embodiments, the lookup table TAB or mathematical function stored in the control unit MC, which in each case map the measured mean flow speed $v_M$, the fluid temperature T and the mixing ratio R onto a quotient of the actual mean flow speed v to the measured mean flow speed $v_M$, is used for mathematical calculation of a current value for a compensation factor K for the measured mean flow speed $v_M$.

An adjustable flow valve 20 can also be seen in the example of FIG. 2, which, in addition to the heat flow measuring device 10, also has a valve unit 13 received in the housing G. The valve unit 13 is arranged without inflow and outflow in series with the measuring section MESS, so the same volume flow VS flows through the measuring section MESS and through the valve unit 13. In some embodiments, the valve unit 13 can be arranged as a separate assembly outside of the housing G downstream or upstream of the measuring section MESS without intermediate inflow and outflow. The valve unit 13 can be actuated at least indirectly by means of the control unit MC for setting a desired value for the volume flow VS. The adjustable flow valve 20 is typically adapted to adjust the heat flow WS to a desired value received, for example, via the bus interface BUS of the adjustable flow valve 20.

Figure 3:
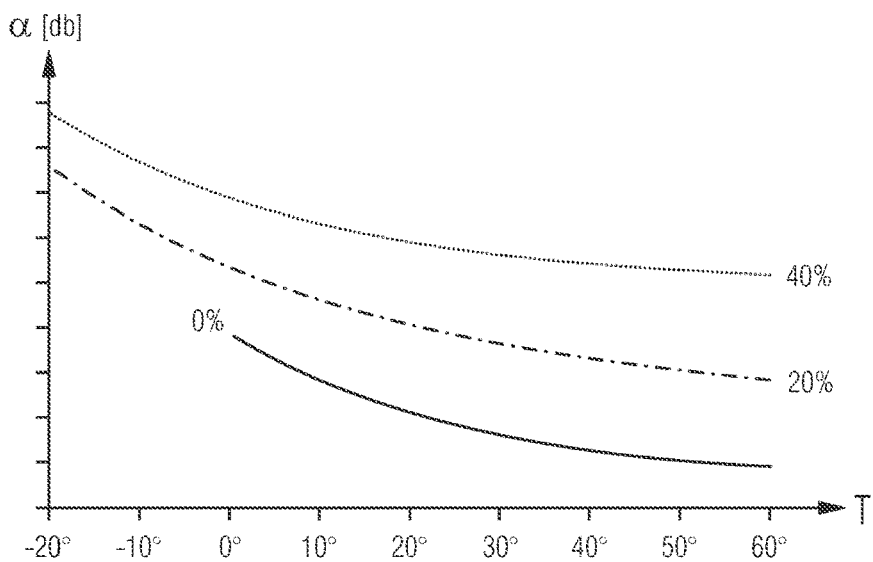
FIG. 3 shows an exemplary graph, which shows the connection between the ultrasonic attenuation, the fluid temperature using the example of a water/glycol mixture and the mixing ratio of the water/glycol mixture.

FIG. 3 shows an exemplary graph, which shows the connection between the ultrasonic attenuation, the fluid temperature using the example of a water/glycol mixture and the mixing ratio of the water/glycol mixture. In some embodiments, the ultrasonic attenuation α on the one hand likewise increases with increasing mixing ratio R, in other words with an increasing concentration of the glycol, using the example of three concentration values of 0% (pure water), 20% and 40%. On the other hand, the ultrasonic attenuation α decreases with increasing fluid temperature T. It is noted that the illustrated characteristic curves in FIG. 3 (here using the example of (mono-)ethylene glycol) differ slightly from those of the propylene glycol as a further customary glycol antifreeze. The selection of glycol antifreeze can be input, for example manually, at the heat flow measuring device 10 or at the adjustable flow valve 30 or be read from the valve via the bus interface BUS.

In addition to the mixing ratio R, the control unit MC of the heat flow measuring device 10 or the adjustable flow valve 30 can also be adapted to determine the type of glycol antifreeze used, in other words (mono-)ethylene glycol or propylene glycol. In this case, the determination is made on the basis of frequency-dependent comparison attenuation values, for example from a previous series of reference measurements for water/(mono-)ethylene glycol mixtures and water/propylene glycol mixtures with different mixing ratios, at different fluid temperatures and at different transmission frequencies used for the ultrasonic signal irradiated into the measuring section. The ultrasonic signal can be irradiated, for example, at two or more different frequencies into the measuring section, such as at 1 MHz, 1.5 MHz or 2 MHz. The above-described lookup tables or mathematical functions can then be expanded by these additional «transmission frequencies». By comparison of the frequency-dependent comparison attenuation values with the values of the stored lookup table or the mathematical function, it is then possible to determine the glycol antifreeze to be selected.

LIST OF REFERENCE CHARACTERS

1 arrangement for measuring a heat flow
2 line section, pipe section
2' measuring pipe, further line section
3 second means, ultrasonic measuring arrangement
4, 41, 42 heat exchanger, heating element
10 heat flow measuring device
11 first temperature measurement input 12 second temperature measurement input
13 valve, settable valve
20 adjustable flow valve, Smart Valve
30 ultrasonic measuring device
31 first ultrasonic transducer
32, 32' second ultrasonic transducer
50 fluid temperature sensor
51 first temperature sensor
52 second temperature sensor
61 first external temperature sensor
62 second external temperature sensor
A flow cross-section
AL outlet, outlet opening
AUS outlet position
BUS bus connection
$c_P$ specific heat
EIN input position
EL inlet, inlet opening
FL fluid, mixture
G housing
GLY glycol
$H_2O$ water
L measuring distance
MC microcontroller
MESS measuring section
RFL reflector
T fluid temperature
T1 input temperature
T2 outlet temperature
TAB lookup table, electronic lookup table
US1 first ultrasonic signal
US2 second ultrasonic signal
v actual mean flow speed
$v_M$ metrologically determined flow speed
VS volume flow
WS heat flow
WS1, WS2 partial heat flow
WZ counter reading, heat counter reading
α ultrasonic attenuation
β measuring angle, acute angle
ρ density
ΔT temperature difference

The invention claimed is:

1. A method for determining the mixing ratio R of a fluid comprising a mixture of at least two different fluids for a technical process in a device including a fluid flow path from an input to an output, the method comprising:
    irradiating an ultrasonic signal with a transmission level along a measuring distance running inside a measuring section of the fluid flow path;
    measuring a receiving level of the ultrasonic signal at one end of the measuring distance;
    determining an ultrasonic attenuation of the ultrasonic signal attenuated by the fluid based at least on the transmission and receiving levels of the ultrasonic signal;
    measuring a temperature of the fluid flowing through the measuring section; and
    determining a mixing ratio of the at least two different fluids from the determined ultrasonic attenuation and from the measured fluid temperature; and
    determining a first ultrasonic attenuation and a second ultrasonic attenuation based at least on respective transmission and receiving levels of two ultrasonic signals;
    wherein within the measuring distance a first ultrasonic signal is irradiated along the measuring distance and a second ultrasonic signal in the opposite direction along the measuring distance; and
    determining the ultrasonic attenuation includes using a mean of the first ultrasonic attenuation and the second ultrasonic attenuation.

2. The method as claimed in claim 1, wherein the mixture comprises water and an antifreeze.

3. The method as claimed in claim 2, wherein determining a current value of the mixing ratio R includes using a lookup table or mathematical function mapping the ultrasonic attenuation and the fluid temperature onto the mixing ratio.

4. A method for determining a heat flow given off by a heat-conveying fluid comprising a mixture of at least two different fluids, wherein the fluid flows from an input through a measuring section to an outlet along a fluid flow path, wherein the fluid at the input position has a measured input temperature and at the outlet position has a measured outlet temperature, wherein the method comprises:
    measuring a temperature of the fluid in the measuring section;
    calculating a temperature difference between the input temperature and the outlet temperature;
    measuring a volume flow of the fluid flowing between the inlet position and the outlet position;
    determining the mixing ratio of the at least two different fluids;
    determining a density and a specific heat of the heat-conveying fluid based at least on the measured fluid temperature and the determined mixing ratio; and
    determining the heat flow emanating from the fluid based at least on the product of the measured volume flow, the calculated temperature difference, the determined density, and the determined specific heat;
    wherein determining the mixing ratio includes irradiating the mixture passing through the measuring section along a first path set at an angle to the fluid flow path using a first ultrasonic signal, measuring an attenuation of the first signal, irradiating the mixture passing through the measuring section along a second path opposite to the angle using a second ultrasonic signal, measuring an attenuation of the second signal, and calculating an arithmetic mean of the attenuation of the first signal and the attenuation of the second signal.

5. The method as claimed in claim 4, wherein determining the volume flow and irradiating the mixture on the first path take place in measuring phases at separate times.

6. The method as claimed in claim 4, further comprising determining a current value for the density and a current value for the specific heat of the heat-conveying fluid using a lookup table or a mathematical function mapping the calculated mixing ratio R and the measured fluid temperature onto the density and specific heat to be determined of the heat-conveying fluid.

7. The method as claimed in claim 4, further comprising:
    determining a compensation factor for the measured mean flow speed based at least in part on the measured fluid temperature and from the determined mixing ratio; and
    calculating the volume flow based at least in part on a product of the flow cross-section, the measured flow speed, and the compensation factor.

8. The method as claimed in claim 7, further comprising determining a current compensation value for the measured mean flow speed using a lookup table or mathematical function mapping the measured mean flow speed, the fluid temperature, and the mixing ratio onto a quotient of the actual mean flow speed to the measured mean flow speed.

9. A system for measuring a heat flow, the system comprising:
a control unit for calculating a temperature difference between an input temperature and an outlet temperature;
a first meter for measuring a volume flow of the fluid through the measuring section;
a first ultrasonic transmitter irradiating the fluid passing through the measuring section along a first path set at an angle to the fluid flow path using a first ultrasonic signal;
a second ultrasonic transmitter irradiating the mixture passing through the measuring section along a second path opposite to the angle using a second ultrasonic signal,
wherein the control unit measures an attenuation of the first signal received at the second ultrasonic transmitter, measures an attenuation of the second signal received at the first ultrasonic transmitter, and calculates an arithmetic mean of the attenuation of the first signal and the attenuation of the second signal;
a temperature sensor for detecting a fluid temperature of the fluid flowing through the measuring section; and
wherein the control unit is further programmed to determine the heat flow based on the temperature difference, the volume flow, the arithmetic mean of the ultrasonic attenuation, and a fluid temperature in the measuring section.

10. The system as claimed in claim 9, further comprising
a first temperature sensor arranged at the input position for detection of the input temperature; and
a second temperature sensor arranged at the outlet position for detection of the outlet temperature.

11. The system as claimed in claim 10, wherein the control unit is programmed to derive the fluid temperature in the measuring section from the detected input temperature and/or from the detected outlet temperature.

12. A heat flow measuring system for heat flow measurement, the system comprising:
a housing;
a line section mounted in the housing;
an inlet and outlet in the housing for a fluid flowing through a measuring section inside the line section;
a fluid temperature sensor arranged in the housing in the region between the inlet and the outlet for measuring a fluid temperature;
a meter for measuring the volume flow of the fluid flowing through the measuring section;
a first ultrasonic transmitter irradiating the fluid passing through the measuring section along a first path set at an angle to the fluid flow path using a first ultrasonic signal;
a second ultrasonic transmitter irradiating the mixture passing through the measuring section along a second path opposite to the angle using a second ultrasonic signal,
a control unit programmed to measure an attenuation of the first signal received at the second ultrasonic transmitter, measure an attenuation of the second signal received at the first ultrasonic transmitter, and calculate an arithmetic mean of the attenuation of the first signal and the attenuation of the second signal;-and
wherein the control unit is further programmed to determine a heat flow from a temperature difference between the first and second external temperature, or between the fluid temperature and the second external temperature, or between the first external temperature and the fluid temperature, and the volume flow, the mean of the ultrasonic attenuation, and the fluid temperature, and to output a current value of the heat flow.

13. A device as claimed in claim 9, wherein
the control unit is programmed to actuate the first and second ultrasonic transducers alternately for irradiating and receiving a respective ultrasonic signal for determination of the mean flow speed and the ultrasonic attenuation in measuring phases at separate times.

14. The device as claimed in claim 9, further comprising:
a non-volatile memory; and
a lookup table or a mathematical function for determination of a current value of the mixing ratio stored in the non-volatile memory, mapping the ultrasonic attenuation and the fluid temperature onto the mixing ratio of the water/glycol mixture; and/or
a lookup table or a mathematical function for determination of a current value for the density and the specific heat stored in the non-volatile memory, mapping the calculated mixing ratio and the measured fluid temperature onto the density and specific heat to be determined; and/or
a lookup table or a mathematical function for determination of a current compensation value for the measured mean flow speed stored in the non-volatile memory, mapping the measured mean flow speed, the fluid temperature, and the mixing ratio onto a quotient of the actual mean flow speed to the measured mean flow speed.

15. An adjustable flow valve comprising:
a housing;
a line section mounted in the housing;
an inlet and outlet in the housing for a fluid flowing through a measuring section inside the line section;
a heat flow measuring device including:
a fluid temperature sensor arranged in the housing in the region between the inlet and the outlet for measuring a fluid temperature;
a meter for measuring the volume flow of the fluid flowing through the measuring section;
a first ultrasonic transmitter irradiating the fluid passing through the measuring section along a first path set at an angle to the fluid flow path using a first ultrasonic signal;
a second ultrasonic transmitter irradiating the mixture passing through the measuring section along a second path opposite to the angle using a second ultrasonic signal,
a control unit programmed to measure an attenuation of the first signal received at the second ultrasonic transmitter, measure an attenuation of the second signal received at the first ultrasonic transmitter, and calculate an arithmetic mean of the attenuation of the first signal and the attenuation of the second signal; and
wherein the control unit is further programmed to determine a heat flow from a temperature difference between the first and second external temperature, or between the fluid temperature and the second external temperature, or between the first external temperature and the fluid temperature, and the volume flow, the mean ultrasonic attenuation, and the fluid temperature and to output a current value of the heat flow;
a valve unit mounted in the housing which can be actuated by the control unit for setting an equal volume flow flowing through the valve unit and through the measuring section.

* * * * *